1

3,247,193
SULPHONAMIDES AND THE PREPARATION THEREOF
Kurt Menzl, Linz, Austria, assignor to Österreichische Stickstoffwerke Aktiengesellschaft, Linz, Austria
No Drawing. Filed Mar. 6, 1963, Ser. No. 263,135
Claims priority, application Austria, Mar. 14, 1962,
A 2,108/62
1 Claim. (Cl. 260—239.95)

The present invention relates to new sulphonamides of the general formula:

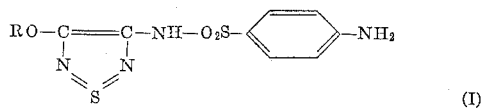

wherein R represents a methyl or ethyl group.

These new sulphonamides, 3-methoxy-4-(4'-aminobenzene-sulphonamido)-1:2:5-thiadiazole or 3-methoxy-4-(sulphanilamido)-1,2,5-thiadiazole and 3-ethoxy-4-(4'-aminobenzene-sulphonamido)-1:2:5-thiadiazole or 3-ethoxy-4-(sulphanilamido)1,2,5-thiadiazole, are characterized by particularly interesting physiological properties. They possess a broad antibacterial activity spectrum and are very quickly absorbed in the blood, so that a high concentration is reached in the blood within a short time and this high concentration is maintained over an extended period owing to a somewhat retarded elimination. Particularly noteworthy is that the sulphonamides of Formula I easily penetrate the blood-brain barrier and other tissular barriers, so that high concentrations can be observed in the tissues and in the body fluids very soon after the maximum concentration in the blood has been reached. Thus, for example, the two new sulphonamides can be detected in the brain a short while after intravenous administration. Their ability of penetration is also strikingly illustrated by the fact that two hours after intravenous administration the concentration in the aqueous humour of the eye practically equals the blood level.

This good ability to penetrate the blood-brain and tissular barriers is extremely important from the therapeutic point of view, since the sulphonamides are intended to act primarily in the tissues, so that a high concentration in the tissues contributes favourably to the overall therapeutical effect.

The sulphonamides according to the invention are also suitable for the treatment of wound infections caused by the most diverse pathological agents, the absence of granulation-inhibition, in contrast to most other sulphonamides, being another distinguishing feature of these new sulphonamides.

United States Patent No. 2,358,031 describes sulphonamides of the thiadiazole series in a very general manner, indicating that these sulphonamides are derived from six different aminothiadiazoles, among them 3-amino-1:2:5-thiadiazole and may be substituted on the thiadiazole ring by a number of substituents, including alkoxy groups. For their preparation, the patent recommends the reaction of the correspondingly substituted thiadiazole derivatives with p-acylamino-benzene-sulphochlorides. It is stated that many of these compounds display an anti-bacterial activity. However, the patent describes in detail only the 2-sulphanilamido-1:3:4-thiadiazoles as relevant substances, which can be substituted, if necessary, by a methyl- or phenyl radical in the 5-position. Although it can thus be learned from the United States patent that sulphonamides of the thiadiazole series can be generally prepared by reacting the corresponding aminothiadiazoles with acylamino-benzene-sulphochlorides and that some of the compounds possess antibacterial activity, the patent does not indicate in any way that the hitherto unknown sulphonamides, namely 3-ethoxy-4-(4'-aminobenzene-sulphonamido)-1:2:5-thiadiazole and 3-methoxy-4-(4'-aminobenzene-sulphonamido)-1:2:5-thiadiazole can be prepared in a very advantageous manner by reacting 3-halo-4-amino-1:2:5-thiadiazoles with acylamino-benzene-sulphochlorides and subsequently replacing the halogen atom by an ethoxy or methoxy group and that, in addition to a very good antibacterial activity, these sulphonamides are primarily distinguished by a very good ability to penetrate the body fluids and tissues, which is even more unexpected in view of the fact that the 2-sulphanilamido-5-alkyl-1:3:4-thiadiazoles have little ability to penetrate the tissues.

In accordance with this invention the new sulphonamides of general Formula I herein are prepared by a process which comprises reacting a halogenated thiadiazole-aminosulphonyl compound of the general formula

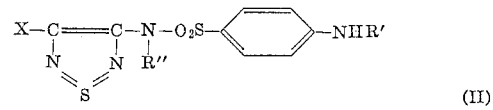

wherein X is a halogen atom, R' is an acyl group and R'' is a hydrogen atom or the radical

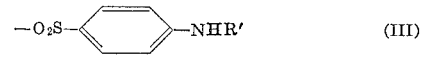

with an alkali metal methylate or ethylate to replace the hydrogen atom by a methoxy or an ethoxy group, and heating the resulting compound with an aqueous alkali metal hydroxide in order to split off the acyl group in the 4-position on the benzene ring and, when present, the second p-acylamino-benzene-sulphonyl group. The sulphonamides of Formula I can then be separated by acidifying the alkaline saponifying solution.

As halogenated thiadiazole-amino-sulphonyl compounds of Formula II there may be used both those having one sulphonyl radical and those having two sulphonyl radicals in the molecule as well as mixtures of the two sulphonyl compounds. It has been found that the replacement of the halogen atom by a methoxy or an ethoxy group is effected particularly advantageously when disulphonyl derivatives of 4-halo-3-amino-1:2:5-thiadiazole are employed. One to two hours subsequent boiling with aqueous alkali metal hydroxides such as sodium or potassium hydroxide suffices to split off the second sulphonyl radical, removing simultaneously the acyl group protecting the amino group in the 4-position.

As acyl radicals for the protective blocking of the amino group in the 4-position there may be mentioned acyl radicals derived from lower aliphatic carboxylic acids, such as the acetyl radical and the carboethoxy radical. The carboethoxy radical gives particularly good results when employed as a protective group.

The sulphonyl compounds of Formula II can be prepared by reacting 3-halo-4-amino-1:2:5-thiadiazole with one or two mols of p-acylamino-benzene-sulphochloride, in an organic base as solvent.

The new 3-halo-4-amino-1:2:5-thiadiazoles used as starting materials can be obtained by halogenating 4-amino-thiadiazole. The latter can be prepared by the cleavage of 2,6-diketo-8-thiapurine as described in patent application Serial No. 254,578, filed January 29, 1963, now U.S. Patent No. 3,155,878, to yield 4-amino-1:2:5-thiadiazole-3-carboxylic acid which is subsequently decarboxylated by heating in trichlorobenzene.

The invention is illustrated by the following examples, in which all parts are parts by weight unless otherwise indicated.

*Example 1*

60 parts of 3-bromo-4-amino-1:2:5-thiadiazole are dissolved in 200 parts by volume of pyridine. To this solution there are added slowly, at 35° C., 184.4 parts of 4- carbethoxyamino-benzene-sulphochloride, whereafter the mixture is heated to 45° C. for one hour and then to 75° C. for two hours. The pyridine is removed under vacuum and the residue is suspended in water. The crystallizate so obtained is filtered out and dried. In this manner, 192.3 parts of raw 3-bromo-4-bis-(4'-carbethoxyamino-benzenesulphonyl)-amino-1:2:5-thiadiazole melting at 241° to 243° C. are obtained, corresponding to a yield of 91% of the theoretical.

13.6 parts of 3-bromo-4-bis-(4'-carbethoxyaminobenzenesulphonyl)-amino-1:2:5-thiadiazole are suspended in 100 parts by volume of absolute ethanol and heated to 60° C. To this suspension there are added dropwise and at the same temperature a solution of 1.4 parts of sodium in 50 parts by volume of absolute ethanol. The reaction mixture is left to boil under reflux until a sample shows it to be free of halogen, whereafter the solvent is distilled off in vacuum and the residue is saponified by boiling it for two hours with about 100 parts by volume of 10% aqueous sodium hydroxide. The alkaline solution of the saponifying step is brought to pH 6.5 with hydrochloric acid, treated with bone char and filtered. The filtrate is further acidified to pH 3.8 whereby a precipitate forms which is separated, washed with water, dried and recrystallized from benzene. 4.6 parts of 3-ethoxy-4-(4'-aminobenzenesulphonamido)-1:2:5-thiadiazole are obtained, corresponding to a yield of 71.4% of the theoretical. The substance has two variants, one of which melts at 123.5° to 124.5° C. while the other melts at 115° to 116° C.

The 3-bromo-4-amino-1:2:5-thiadiazole employed as starting material is prepared in the following manner:

101 parts of 4-amino-1:2:5-thiadiazole are dissolved in 200 parts by volume of glacial acetic acid and mixed with 177 parts of bromine in 60 parts by volume of glacial acetic acid, whereafter the mixture is left to stand for a week. The crystals separating are collected, suspended in water and left to stand for some time, again separated and distilled with steam. 115.6 parts of 3-bromo-4-amino-1:2:5-thiadiazole melting at 125° to 125.5° C. are obtained, which corresponds to a yield of 64.2% of the theoretical.

*Example 2*

60 parts of 3-bromo-4-amino-1:2:5-thiadiazole are dissolved in 200 parts by volume of pyridine. Into this solution there are introduced slowly 87.8 parts of 4-carbethoxyaminobenzenesulphochloride, whereafter the mixture is left to stand for about one hour at 40° C. and subsequently heated to a temperature of 70° to 75° C. At the end of the reaction the pyridine is removed in vacuum and the residue is taken up in 600 parts by volume of water. The precipitate separating is filtered off, repeatedly washed with water, dried and treated with a diluted solution of ammonia. The 3-bromo-4-(4'-carbethoxy-aminobenzenesulphonamido)-1:2:5-thiadiazole goes into solution from where it is precipitated after filtration and acidification of the filtrate to pH 3.5. 44 parts of this compound are obtained, melting at 224° to 227° C. which corresponds to 32.4% of the theoretical yield. After recrystallization from isopropanol, the product displays a melting point of 228° to 229° C.

The portion insoluble in ammonia consists of 3-bromo-4-bis(4'-carbethoxyaminobenzenesulphonyl)-amino-1:2:5-thiadiazole. 60 parts of this compound are obtained, melting at 240° to 243° C. which corresponds to a yield of 56.8% of the theoretical.

If the separation with ammonia is omitted, then a mixture of 3-bromo-4-(4'-carbethoxyaminobenzenesulphonamido)-1:2:5-thiadiazole and 3-bromo-4-bis(4'-carbethoxyaminobenzenesulphonyl)-amino-1:2:5-thiadiazole is obtained in a yield of 89.2% of the theoretical, calculated on the 4-amino-3-bromo-1:2:5-thiadiazole.

The ratio of the two compounds to each other was not altered by varying the reaction temperature, nor by varying the rate of the sulphochloride addition.

20.4 parts of 3-bromo-4-(4'-carbethoxyaminobenzene-sulphonamido)-1:2:5-thiadiazole having a melting point of 224° to 227° C. are suspended in 150 parts by volume of absolute ethyl alcohol. Hereto are added, dropwise and at a temperature of 60° C. a solution of 3.45 parts of sodium in 150 parts by volume of absolute ethyl alcohol. The mixture is boiled under reflux until a sample shows it to be free of the halogen, whereafter the solvent is distilled off under vacuum, the solution is brought to pH 7, treated with bone char, filtered and the filtrate is adjusted to pH 5. The precipitate is separated from the liquor and saponified by heating with 300 parts by volume of 5% aqueous sodium hydroxide. The solution from the saponification step is brought to pH 6.6 by the addition of hydrochloric acid, treated with bone char, filtered and acidified to pH 5.5. The substance precipitated is separated and recrystallized first from 50% acetic acid, then from benzene. 9.7 parts of 3-ethoxy-4-(4'-aminobenzenesulphonamido)-1:2:5-thiadiazole melting at 123.5° to 124.5° C. are obtained, which corresponds to a yield of 64.7% of the theoretical.

*Example 3*

50 parts of 3-chloro-4-amino-1:2:5-thiadiazole are dissolved in 200 parts by volume of pyridine, and to this solution there are added 107 parts of 4-carbethoxyaminobenzenesulphochloride. The mixture is first heated to 40° C. for about an hour, then to 70° to 75° C. for three hours. The solvent is distilled off at the end of the reaction and the residue is taken up in 600 parts by volume of water. The precipitate is filtered off, washed with water and dried. Raw 3-chloro-4-(4'-carbethoxyaminobenzenesulphonamido)-1:2:5-thiadiazole (melting point of the pure compound: 222° to 223.5° C.) is obtained, in a yield of over 90% of the theoretical. The raw product contains some 3-chloro-4-bis-(4'-carbethoxyamino-benzenesulphonyl)-amino-1:2:5-thiadiazole melting at 236° to 237° C. which can be separated if necessary in the manner indicated in Example 2.

109 parts of the raw 3-chloro-4-(4'-carbethoxyaminobenzenesulphonamido)-1:2:5-thiadiazole are dissolved in 800 parts by volume of absolute ethanol and mixed with 20.7 parts of sodium dissolved in 700 parts by volume of absolute ethanol, in the manner described in Example 2. The mixture is boiled under reflux until a halogen-free sample is obtained. The solvent is hereafter distilled off and the residue is saponified by heating it with 10% aqueous sodium hydroxide solution. After cooling, the reaction solution is processed in the manner described in Example 2. 51.6 parts of 3-ethoxy-4-(4'-aminobenzenesulphonamido)-1:2:5-thiadiazole are obtained.

The preparation of the 3-chloro-4-amino-1:2:5-thiadiazole employed as starting material is carried out in the following manner:

33.7 parts of 4-amino-1:2:5-thiadiazole are dissolved in 80 parts by volume of glacial acetic acid. Chlorine is run in until saturation, whereafter the mixture is left to stand in daylight for three days. The precipitate is filtered off, the mother liquor is concentrated several times, whereafter the precipitates are combined and steam-distilled. 29.8 parts of 3-chloro-4-amino-1:2:5-thiadiazole, melting at 117.5° to 118° C. are obtained, corresponding to a yield of 66% of the theoretical.

*Example 4*

63.4 parts of 3-bromo-4-bis-(4'-carbethoxyamino-benzenesulphonyl)-amino-1:2:5-thiadiazole are suspended in 600 parts by volume of methanol (absolute). There is added slowly at a temperature of about 60° C. a solution of 6.9 parts of sodium in 140 parts of absolute methanol, subsequently heating the mixture under reflux until a halogen-free sample is obtained. The solvent is distilled off in vacuum and the residue is saponified with 10% aqueous sodium hydroxide solution. Lastly, the free sulphonamide is precipitated by acidifying the mixture to pH 3.8 and the precipitate is recrystallized from diluted acetic acid (1:1) after treatment with bone char. 18.3 parts of 3-methoxy-4-(4'-aminobenzenesulphonamido)-

1:2:5-thiadiazole melting at 149° to 150° C. are obtained, corresponding to a yield of 64% of the theoretical.

I claim:
3-ethoxy-4-(sulfanilamido)-1,2,5-thiadiazole.

References Cited by the Examiner
UNITED STATES PATENTS

| | | | |
|---|---|---|---|
| 2,358,031 | 9/1944 | Roblin et al. | 260—239.95 |
| 2,430,439 | 11/1947 | Winnek et al. | 260—239.75 |
| 2,494,524 | 1/1950 | Sprague | 260—239.9 X |
| 3,066,147 | 11/1962 | Carmack et al. | 260—239.95 |
| 3,082,206 | 3/1963 | Langley | 260—239.75 |

FOREIGN PATENTS 886,693  1/1962  Great Britain.

OTHER REFERENCES

Elderfield: "Heterocyclic Compounds," vol. 7, pp. 579–584, John Wiley and Sons, Inc., N.Y. (1961).

WALTER A MODANCE, *Primary Examiner.*

NICHOLAS S. RIZZO, JOHN D. RANDOLPH,
*Examiners.*

E. E. BERG, *Assistant Examiner.*